Oct. 23, 1923.　　　　　　　　　　　　1,471,629
I. A. PARRY
DOUGH MIXER
Filed April 2, 1923
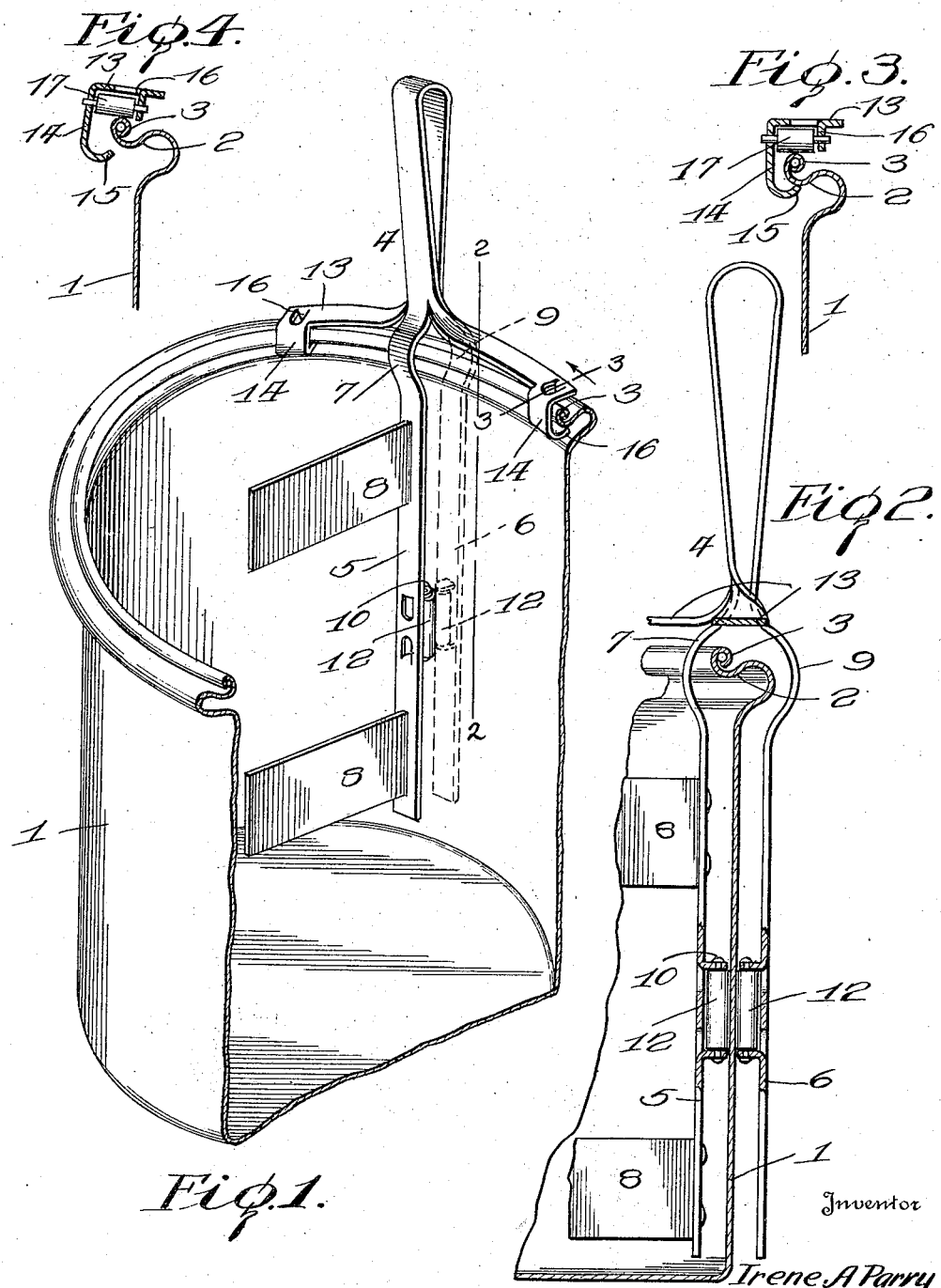
Inventor
Irene A Parry
By Fred P. Lorin
Attorney Patented Oct. 23, 1923.

1,471,629

UNITED STATES PATENT OFFICE.

IRENE A. PARRY, OF SEATTLE, WASHINGTON.

DOUGH MIXER.

Application filed April 2, 1923. Serial No. 629,418.

*To all whom it may concern:*

Be it known that IRENE A. PARRY, a subject of Great Britain, residing at Seattle, in the county of King and State of Washington, has invented certain new and useful Improvements in Dough Mixers, of which the following is a specification.

This invention relates to improvements in dough mixers.

The object of the invention is to provide a convenient means for mixing dough, primarily for domestic purposes, and one which can be readily assembled for use or taken apart for cleaning purposes.

A further object of the invention is to provide specific improvements in the moving parts to reduce friction in the operation of mixing dough.

The invention also comprehends improvements in the details of construction and arrangement of parts which will be hereinafter described and particularly pointed out in the claims.

In the drawings:

Fig. 1 is a perspective view of the improved dough raiser.

Fig. 2 is a vertical section on line 2—2 of Fig. 1.

Fig. 3 is a detail section on line 3—3 of Fig. 1.

Fig. 4 is a similar view on the same line but showing the handle tipped to insert or remove it from the container.

1 indicates a container having its upper edge beaded to form an overhanging portion 2, and a track 3.

4 indicates a handle formed from resilient metal and bent at its upper end to provide two legs 5 and 6, the resiliency of the metal being such that the lower ends of the legs tend to impinge the inner and outer surfaces of the wall of the container. The inner leg 5 is formed with a bulge 7 to facilitate applying the handle to the container, and projecting from the said inner leg are two paddles 8, which engage and mix the dough in the operation of the mixer. The outer leg 6 is bulged at 9 adjacent the bulge 7, to facilitate pulling the handle over the beaded edge of the container. On the inner surfaces of the two legs are bearings 10 to receive pintles of vertical rollers 12, which engage the inner and outer surfaces of the container when the handle is oscillated, as will presently appear.

Extending from the opposite sides of the inner leg 5, are curved arms 13—13, which correspond to the curvature of the container, and at the ends of these arms are formed inwardly and depending brackets 14, which have their lower ends bent outwardly and slightly upwardly to form lips 15, to engage the underside of the overhanging portion 2 of the bead on the container. The arms 13 adjacent the brackets 14, are cut out to form lips 16, which are bent downwardly to form bearings for all outer rollers 17 which roll on the track 3.

In operation, the open lower end of the handle is forced over the track 3 and bead 2, the legs being sprung apart to permit the rollers 12 to pass, while the bulges 7 and 9 together with the resiliency of the legs allow for the handle to be manipulated to permit of the lips 15 being fitted under the overhanging portion 2 of the bead and the rollers 17 to be properly located on the track 3.

When the handle has been properly positioned on the container, as shown in Fig. 1, dough mix is introduced into the container and then the handle is oscillated and the paddles effectively intermix the ingredients. In the movement of the handle, the brackets 14 and their lips 15 prevent the handle moving upwardly, while the two legs prevent it pulling away from the container. In the oscillating movement the handle is not only maintained in proper relationship by the rollers, but they serve additionally to reduce the friction between the parts, binding being prevented, which renders easy manipulation of the handle by the operator.

Claims:

1. In a dough mixer, the combination of a container having a track at its upper end, a handle having legs adapted to be sprung over the upper edge of the container, anti-friction rollers carried by the handle and adapted to engage the track and the inner and outer surfaces of the wall of the container, and paddles extending inwardly from the handle.

2. In a dough mixer, the combination of a container having a bead at its upper edge, a handle comprising a pair of resilient legs, the handle having lateral arms with anti-friction rollers to engage the upper edge of the container, the arms having lips to engage under the overhanging portion of the bead, and paddles extending inwardly from the handle.

3. In a dough mixer, the combination of a container having a bead at its upper edge, a handle having two resilient legs which straddle the wall of the container, anti-friction rollers on the inner surfaces of the two legs to engage the wall of the container, paddles extending from the handle, lateral arms extending from the handle, brackets extending down from the ends of the arms and provided with outwardly projecting lips to engage under the bead, lips struck from the arms and turned downwardly therefrom to form bearings, and rollers mounted in the bearings to engage and roll on the top of the bead.

4. In a dough mixer, the combination of a container having a track at its upper edge, a frame having a roller bearing which rides on the track, a leg extending down from the frame and on the inside of the container, vanes extending from the leg, and a handle extending upwardly from the frame, whereby the frame and leg may be manually operated on the track to effect mixing of the dough in the container.

In testimony whereof I affix my signature.

(Mrs.) IRENE A. PARRY.